Sept. 3, 1940. E. G. GARTIN Re. 21,548
ROCK DRILL
Original Filed May 11, 1935 3 Sheets-Sheet 1
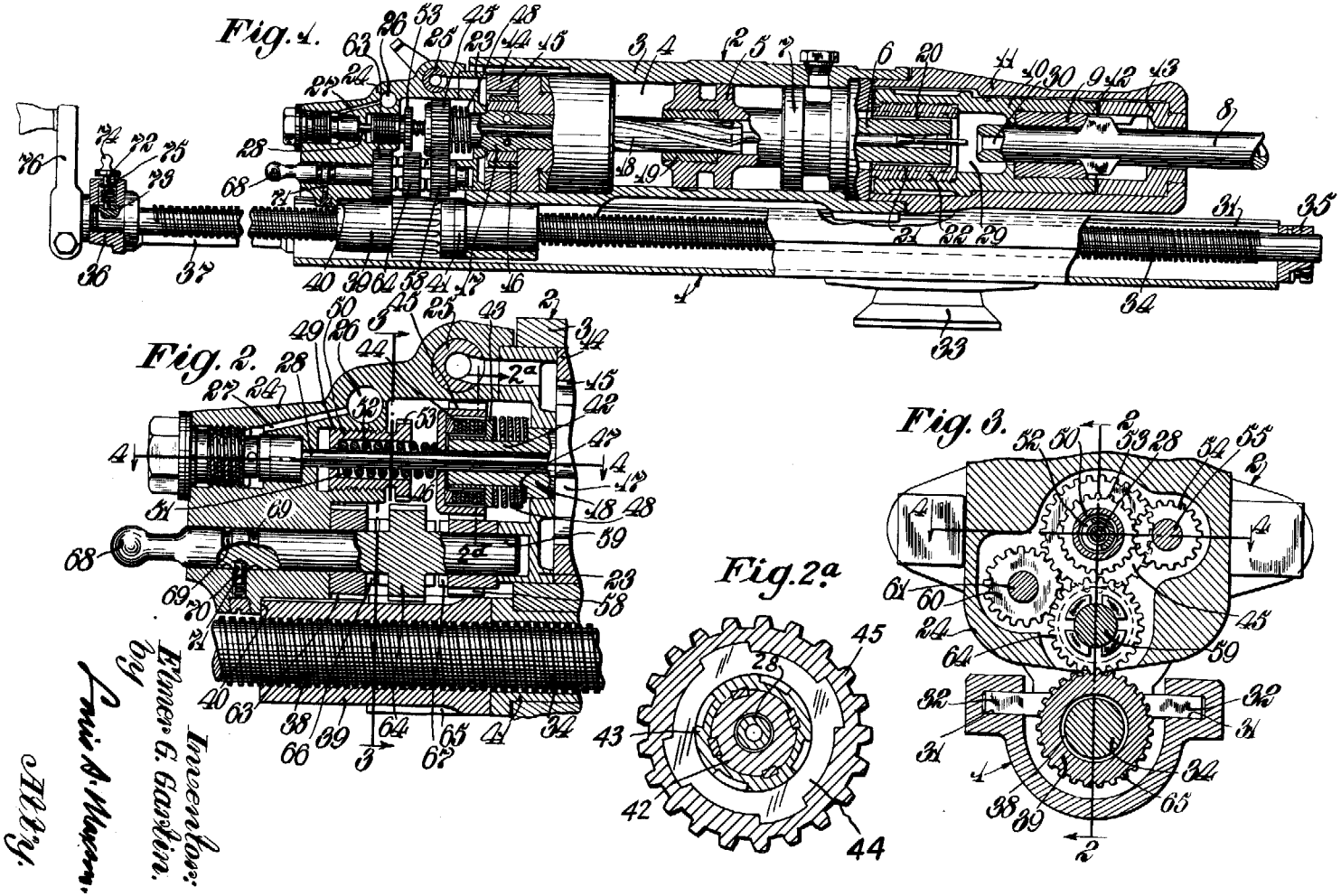

Sept. 3, 1940. E. G. GARTIN Re. 21,548

ROCK DRILL

Original Filed May 11, 1935 3 Sheets-Sheet 2

Inventor:
Elmer G. Gartin.
by Louis A. Mason.
Att'y.

Sept. 3, 1940. E. G. GARTIN Re. 21,548

ROCK DRILL

Original Filed May 11, 1935 3 Sheets-Sheet 3

Inventor:
Elmer G. Gartin.
by
Louis A. Maxon.
Atty.

Reissued Sept. 3, 1940

Re. 21,548

UNITED STATES PATENT OFFICE 21,548

ROCK DRILL

Elmer G. Gartin, Claremont, N. H., assignor to Sullivan Machinery Company, a corporation of Massachusetts Original No. 2,115,911, dated May 3, 1938, Serial No. 21,025, May 11, 1935. Application for reissue March 27, 1939, Serial No. 264,472

31 Claims. (Cl. 121—5)

This is an application for reissue of Letters Patent No. 2,115,911, granted May 3, 1938.

This invention relates to rock drills, and more particularly to improvements in feeding means for a hammer rock drill of the mounted drifter type.

An object of this invention is to provide an improved rock drill feeding means. Another object is to provide an improved automatic drill feeding means operated by the hammer piston of the drill hammer motor. A further object is to provide an improved automatic drill feeding means operated by the hammer piston of the drill hammer motor and driven through an element of the drill steel rotation mechanism. Still another object is to provide an improved automatic drill feeding means operated by the rifle bar of the intermittent ratchet and pawl type rotation means for the drill steel. Yet another object is to provide in a feeding means of the above character, improved frictionally controlled reversing means whereby the direction of feed may be reversed at the operator's will. A still further object is to provide an improved drill feeding means wherein a manual feed is combined with an automatic feed, together with means for rendering the manual and automatic feeding means selectively operative. These and other objects will, however, hereinafter more fully appear.

In the accompanying drawings there are shown for purposes of illustration several forms which the invention may assume in practice.

In these drawings,

Fig. 1 is a view in longitudinal section of a hammer rock drill of the mounted drifter type having embodied therein one illustrative form of the improved feeding means.

Figure 4:
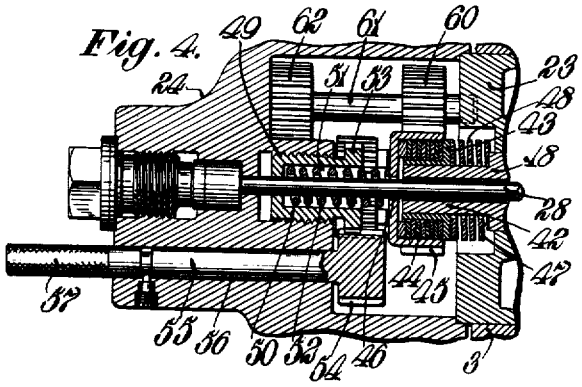
Figure 5:
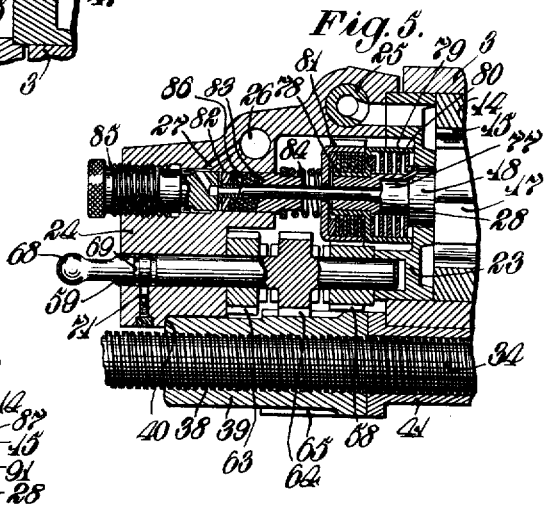
Figure 6:
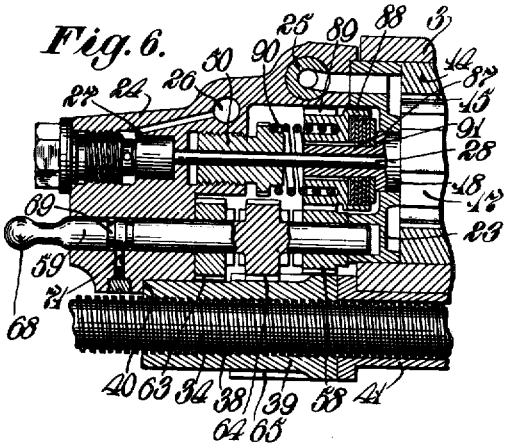
Figure 7:
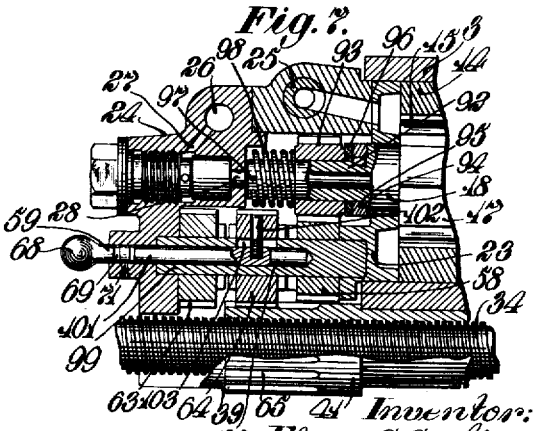
Figure 8:
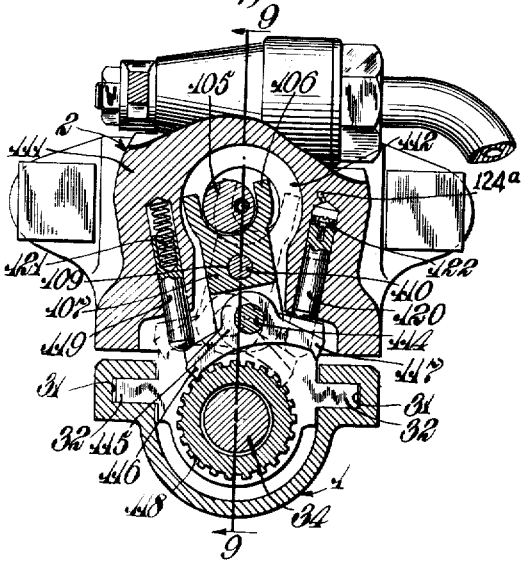
Figure 9:
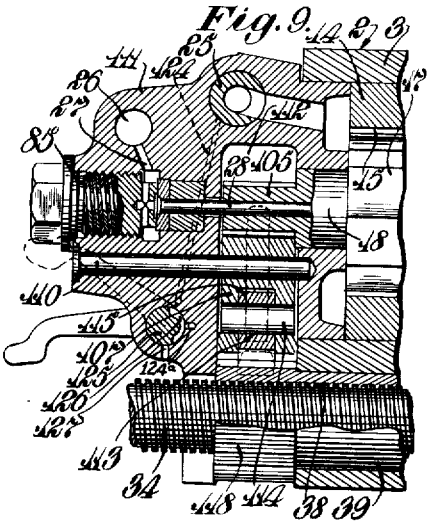
Figure 10:
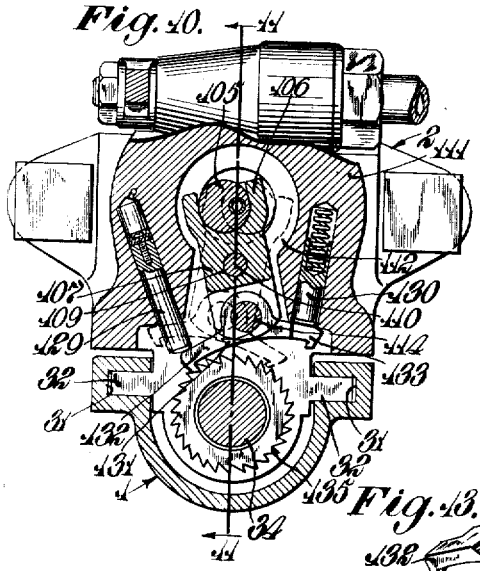
Figure 11:
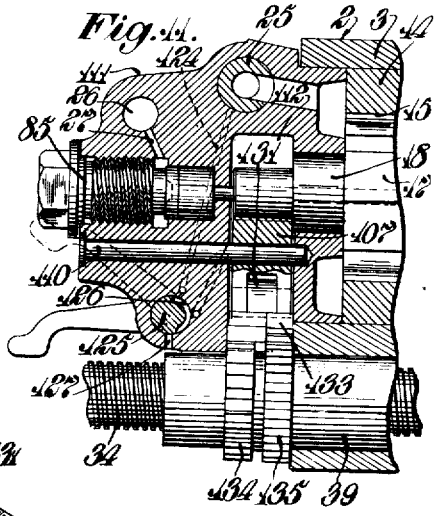
Figure 13:
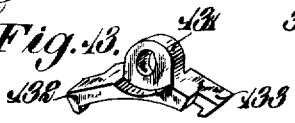
Figure 12:
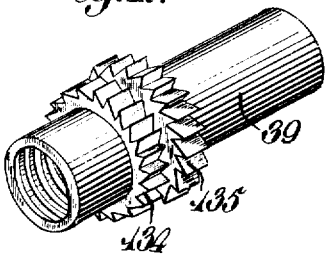

Fig. 2 is an enlarged fragmentary view in longitudinal section taken substantially on line 2—2 of Fig. 3, Fig. 2ᵃ is a detail sectional view taken substantially on line 2ᵃ—2ᵃ of Fig. 2, Fig. 3 is a cross sectional view taken on line 3—3 of Fig. 2, Fig. 4 is a detail sectional view taken substantially on line 4—4 of Figs. 2 and 3, Fig. 5 is a view similar to Fig. 2 showing a modified form of construction, Fig. 6 is a view similar to Fig. 2 showing a further modified form of construction, Fig. 7 is a view similar to Fig. 2 showing still another modified form of construction, Fig. 8 is a cross sectional view showing a further embodiment of the invention, Fig. 9 is a view in longitudinal section taken substantially on line 9—9 of Fig. 8, Figs. 10 and 11 are views similar to Figs. 8 and 9, respectively, showing a further embodiment of the invention, Fig. 12 is a perspective view of the feed nut shown in Figs. 10 and 11 and showing the reversing ratchet teeth, Fig. 13 is a perspective view of the reversible drive pawl shown in Fig. 10.

In these illustrative constructions, the various forms of the improved feeding means are shown embodied in a hammer rock drill of the mounted drifter type generally comprising a guide shell 1 for slidably supporting a drilling motor generally designated 2, of the pressure fluid actuated hammer type. The hammer motor comprises a cylinder 3 having a piston chamber 4 containing a reciprocatory hammer piston 5. The hammer piston has a striking bar 6, guided in the front head 7 of the piston chamber, for delivering impact blows to the shank of a drill steel 8. The drill steel shank is supported in a chuck bushing 9 fixed within a chuck sleeve 10 rotatably mounted in the front chuck housing 11 suitably secured to the front end of the motor cylinder. Clutched at 12 to the chuck sleeve is a driver member 13 having usual driving lugs engageable with lugs on the drill steel shank for rotating the drill steel with the chuck sleeve while permitting free reciprocatory movement of the steel shank with respect thereto. As is usual in rock drills of the type disclosed, means is provided for rotating the drill steel 8 as it is percussively actuated by the hammer piston 5, comprising a ratchet ring 14 suitably fixed within the rear end of the motor cylinder and having internal ratchet teeth 15 with which usual spring pressed pawls 16, supported by a rotatable pawl carrier 17, are engageable. Integral with the pawl carrier is a spirally grooved rifle bar 18 having sliding interlocking connection with a rifle nut 19 fixed within the hammer piston 5. As the hammer piston moves forwardly to deliver a blow to the drill steel shank, the pawls of the pawl carrier slip over the teeth of the ratchet ring, permitting free rifle bar rotation while, when the piston moves rearwardly, the pawls of the pawl carrier engage the ratchet teeth to hold the rifle bar against rotary motion. As a result the piston is rotated during its rearward stroke, and this rotary piston motion is transmitted to the drill steel 8 through straight grooves 20 formed on the periphery of the piston striking bar 6 and slidingly interlocked with straight lugs 21 formed on the chuck nut 22 fixed within the chuck sleeve 10. It is accordingly evident that, as the hammer piston reciprocates, the drill steel 8 is intermittently rotated by the hammer piston through the ratchet and pawl mechanism. The rear end of the motor cylinder is closed by a rear head 23, while suitably secured to the rear end of the cylinder and holding the head and ratchet ring in position is a rear head block 24. Mounted in the usual manner in the head block is a throttle valve 25 for controlling the flow of pressure fluid from a suitable source of supply through suitable ports and passages to the motor cylinder to effect reciprocation of the hammer piston, as is well understood by those skilled in the art. Means is provided for supplying a cleansing liquid to the drill steel, comprising a supply chamber 26 formed in the rear head block 24 and communicating through a passage 27 with a water tube 28, herein extending longitudinally of the cylinder through axial bores in the rifle bar and hammer piston and terminating at its forward extremity within a chamber 29; and this water tube forms a conduit for supplying cleansing liquid to an axial bore 30 formed in the drill steel 8, all in a well known manner. The guide shell 1 is of a standard construction and is provided with longitudinal guideways 31 for receiving lateral guides 32, 32 formed along the sides of the motor cylinder 3, and is provided with a bottom trunnion support 33 adapted to be clamped in a suitable saddle mounting of a suitable support.

Now referring to the improved feeding means shown in Figs. 1 to 4 inclusive, it will be noted that the guide shell 1 has mounted thereon a feed screw 34 journaled at its front end within a bracket 35 fixed to the forward end of the shell, and at its rear end journaled in a bracket 36 secured by rod means 37 to the rearward shell extremity. This screw is held stationary during the automatic feeding operation as hereinafter described, and threadedly engaging the feed screw at 38 is a feed nut 39 rotatably supported by the feed screw and held in position thereon between a shoulder 40 on the head block and the rear face of a sleeve 41, the latter in turn abutting a depending boss on the motor cylinder. In accordance with this invention, formed integrally with the rifle bar 18 is a rearward extension 42, and slidably splined on this extension is a sleeve 43 engaging the adjacent end disc of a multiple disc clutch 44 housed in a spur gear 45. Certain of the clutch discs are connected to the sleeve while others are connected to the spur gear. This spur gear surrounds the rearward extension 42 of the rifle bar in the manner shown in Fig. 2, and is provided with an axial opening 46 for receiving the water tube 28. Interposed between the flange of the sleeve 43 and a shoulder 47 on the rifle bar is a flat coiled spring 48 for urging the sleeve 43 rearwardly with respect to the rifle bar extension. Threaded at 49 within the head block and surrounding the water tube 28 is a plug 50 having a chamber 51 receiving a coiled spring 52, the spring acting between a shoulder on the plug and the rear face of the spur gear 45, and this spring cooperates with the coiled spring 48 in maintaining the disc clutch 44 applied under a load sufficient to effect normal drive but to slip when the drive is overloaded. For adjusting the threaded plug 50 to vary the tension of the coiled spring 52 there is formed integrally with the plug a spur gear 53 with which meshes, as shown in Fig. 4, a spur gear 54 formed integral with a rotatable operating shaft 55. This shaft is rotatably mounted in a bore 56 formed in the head block and has its rearward extremity in the form of a knurled grasping portion 57. When it is desired to adjust the tension of the spring, the operator grasps the portion 57 of the shaft and rotates the gearing 54, 53 in such a manner as to screw the plug 50 inwardly or outwardly as desired. As shown, the spur gear 45 meshes with the teeth of a spur gear 58 journaled on a longitudindal shaft 59 and also meshes with a spur gear 60 (Fig. 4) fixed to a longitudinal shaft 61 suitably journaled within the head and head block. Fixed to the shaft 61 is a spur gear 62 meshing with a spur gear 63 coaxial with the gear 58 and likewise journaled on the shaft 59, the gears 60, 62 constituting a reversed drive. The shaft 59 is mounted for axial movement within its bearings in the head and head block and has formed thereon a spur gear 64 meshing with spur gear teeth 65 formed on the exterior periphery of the feed nut 39. As shown in Fig. 2, formed on the opposite faces of the spur gear 64 are clutch teeth engageable with clutch teeth 66, 67 formed on the adjacent faces of the spur gears 63, 58 respectively. The slidable shaft 59 is provided with an operating handle 68 and has formed on its periphery longitudinally spaced annular grooves 69, 69 and an intermediate locking aperture 70, and a spring pressed plunger 71 carried by the head block is engageable with these grooves and locking aperture for holding the shaft 59 in its opposite positions with the clutch teeth of the gear 64 interlocked with either the clutch teeth 66 or 67 on the spur gears 63 and 58 or for locking the shaft against both axial and rotative movement when the clutch teeth are disconnected, with the gear 64 in its neutral position.

Associated with the automatic feeding means above described is the improved manual feeding means whereby the feed screw 34 may be manually rotated while the feed nut 39 is held against rotation, thereby to effect manual feed of the drill along the shell guideways. During the automatic feeding of the drill the feed screw 34 is held against rotative movement by a spring pressed locking plunger 72 carried by the bracket 36 and engageable with the locking aperture 73 formed on the feed screw, and when it is desired to effect manual feed, this locking plunger is released by grasping the knob 74 formed thereon and lifting the locking pin from the locking aperture, there being formed on the knob 74 a pin 75 engageable with the top surface of the bracket 36 when the locking pin is released for maintaining the locking pin in its released position. Attached to the rearward extremity of the feed screw 34 is a manual operating handle 76.

Now referring to the modifications of the feeding means shown in Figs. 1 to 4 inclusive, it will be observed that in Figs. 5 and 6 the spring clutch loading means, together with the spring tension adjusting means, are somewhat modified, while in Fig. 7 both the spring clutch loading means and the clutch operating means have been somewhat changed. As shown in Fig. 5, the rearward extremity 77 of the rifle bar 18 has mounted thereon a clutch sleeve 78 having a sleeve-like portion 79 housing a coiled spring 80 also surrounding the rifle bar extremity. One end of the spring 80 is fixed to the rifle bar and the other end to the sleeve 78, so that rifle bar rotation is transmitted to the sleeve through the spring. Connected to the sleeve 78 is a series of clutch discs interleaved with a series of clutch discs carried by a spur gear 81 corresponding to the spur gear 45 of the form of the invention shown in Fig. 2. Arranged in a bore 82 formed in the head block is a plug 83, and interposed between a washer supported on this plug and the rear face of the spur gear 81 is a coiled spring 84 for loading the clutch discs. In this instance, a gland plug 85 threaded within the head block provides means for maintaining the packing means 86 for the water tube under compression, and at the same time affords means for adjusting the tension of the spring 84 by moving the plug 83 axially within its bore. Obviously the spring 80 constitutes resilient means for transmitting rotation from the rotation mechanism to the feed nut; and the clutch described will slip upon the stressing of the spring 80 to a predetermined degree. In the form of the invention shown in Fig. 6, the coiled spring 80 is omitted and a series of clutch discs is connected directly to the extremity 87 of the rifle bar 18, and these discs are interleaved with a series of clutch discs fixed to the sleeve-like portion 88 of a spur gear 89 which corresponds to the spur gear 45 of the form of the invention shown in Fig. 2. Interposed between the adjustable plug 50 and the spur gear 89 is a coiled spring 90 for pressing the clutch discs against a shoulder 91 formed on the rifle bar to maintain the clutch applied. The plug 50 is adjustable by the same means as that shown in Fig. 4. In the modification shown in Fig. 7, the rear extremity 92 of the rifle bar 18 has slidably mounted thereon a spur gear 93 corresponding to the spur gear 45 shown in Fig. 2. Engaging a shoulder 94 formed on the rifle bar, and held against rotation with respect to the latter, is a washer 95, while interposed between this washer and the forward face of the gear 93 is a friction plate 96. Engaging the rear face of the spur gear 93 and reacting against pins 97 secured to the rifle bar extremity 92 and surrounding this extremity is a coiled spring 98 for moving the gear 93 forwardly along the rifle bar extremity to press the washer 95 and the inner face of the spur gear in tight frictional engagement with the friction plate 96 for yieldingly connecting the spur gear to the rifle bar extremity. In this instance no adjustment is afforded for the spring 98. The sliding spur gear 64 shown in Fig. 2 is, in Fig. 7, provided with a modified form of operating means and is mounted in a different manner. Rotatably supported within the rear head 23 and the head block 24 is a longitudinally stationary shaft 99 on which the spur gears 58 and 63 are journaled, and this shaft has an axial bore 100. Slidably mounted in this shaft bore is an operating rod 101 connected by a screw 102 to the spur gear 64, this screw extending from the rod through a longitudinal slot 103 in the shaft into connection with the spur gear. This rod 101 is provided with operating and locking means similar to those employed for the sliding shaft 59 of the form of the invention shown in Fig. 2. Otherwise the forms of the invention shown in Figs. 5, 6 and 7 are generally similar to the form of the invention shown in Figs. 1 to 4 inclusive.

The operation of the several forms of the invention thus far described is as follows: When it is desired to effect automatic forward feed of the drilling motor 2 along the shell guideways, the locking pin 72 is operated to lock the feed screw 34 against rotation. The operator then grasps the handle 68 of the sliding shaft 59 to move the clutch teeth on the gear 64 into interlocking engagement with the clutch teeth on the gear 63 and at the same time interrupts locking engagement by the plunger 71 with the locking aperture 70 and effects its engagement in its holding position within one of the grooves 69. The throttle valve 25 of the drilling motor is then turned into a position to supply pressure fluid to the motor cylinder to effect reciprocation of the hammer piston 5, and as a result the drill steel 8 is percussively actuated and intermittently rotated. During the reciprocatory and rotary movements of the hammer piston, the rifle bar 18 is intermittently rotated, and this intermittent rifle bar rotation is transmitted from the rearward portion 42 of the rifle bar through the spring loaded disc clutch 44, spur gear 45, spur gears 60, 62, 63 and the spur gear 64 meshing with the spur gear teeth 65 formed on the rotatable feed nut 39, and as a result the feed nut is rotated with respect to the feed screw in a direction to effect intermittent forward feed of the drilling motor along the guide shell. When it is desired to effect feeding of the drilling motor in a reverse direction with respect to the guide shell, the operator grasps the handle 68 and moves the sliding shaft 59 into its foremost position, bringing the clutch teeth on the gear 64 into interlocking engagement with the clutch teeth on the gear 58 while disconnecting the gear 64 from the gear 63. At this time the feed nut 39 is rotated with respect to the feed screw in a direction to effect reverse feed through the rearward projection 42 of the rotatable rifle bar, disc clutch 44, spur gear 45, spur gear 58, and the spur gear 64 meshing with the gear teeth 65 of the feed nut 39. The tension of the clutch loading springs 52, 48 may be varied as desired by adjusting the plug 50, thereby to prevent overloading of the rotation mechanism and the consequent stalling of the hammer piston. The forms of the invention shown in Figs. 5, 6 and 7 operate to effect feed in the same general manner as the form of the invention shown in Figs. 1 to 4 inclusive.

Now referring to the illustrative embodiment of the invention shown in Figs. 8 and 9, it will be noted that the rifle bar 18 of the drill steel rotation mechanism has formed integral therewith an eccentric portion or crank 105 with which the bifurcated, yoke-shaped end 106 of an oscillatory lever 107 engages, this lever being pivoted at 109 on a longitudinal pivot pin 110 secured within the rear head block 111 of the drilling motor. The lever 107 is mounted for oscillation in transverse planes in a chamber 112 formed in the head block and is bifurcated at its lower end at 113 and carries a longitudinal pivot pin 114 on which is pivotally mounted an oscillatory pawl 115 of the push type. This pawl is of the reversible type having oppositely extending pawl portions 116 and 117 selectively engageable with the ratchet teeth 118 formed on the exterior periphery of the feed nut. Slidably guided in bores formed in the head block and engaging the pawl portions 116 and 117 respectively of the reversing pawl are plungers 119 and 120. The plunger 119 is yieldingly held in engagement with the pawl portion 116 by a coiled spring 121, while the plunger 120 at its upper end carries a packing 122 forming a piston actuated by pressure fluid for yieldingly holding the plunger 120 in engagement with the pawl portion 117. Pressure fluid is adapted to be supplied from the throttle valve 25 through a passage 124, under the control of a manually operable valve 125, to a passage 124a leading to the plunger bore at the upper side of the packing 122. The valve 125 is provided with a groove 126 continuously connected with the passage 124a leading to the space above plunger 120 and communicable alternatively with passage 124 and with a vent passage 127, the latter for venting the upper end of the plunger bore when the flow of pressure fluid through passage 124 to the plunger receiving bore is interrupted. When the parts are in the position shown in Fig. 8, the then active plunger 119 maintains the pawl portion 116 yieldingly in engagement with the ratchet teeth, and as the rifle bar 18 is rotated by the hammer piston during its reciprocation, the lever 107 is oscillated about its pivot to move the pawl to effect rotation of the feed nut to effect retraction of the drilling motor. When it is desired to reverse the motor travel and effect forward feed, pressure fluid is supplied to the plunger bore to act on the packing 122, thereby to force the pawl into the dotted line position shown in Fig. 8 with the pawl portion 117 engaging the ratchet teeth, and as the lever 107 is oscillated by the rifle bar, the feed nut is rotated in the reverse direction and the drill fed forwardly.

In the illustrative embodiment of the invention shown in Figs. 10 to 13 inclusive, the pawl is of the pull type instead of the push type, as shown in Fig. 8, and in this instance the plunger 129 is pressure fluid actuated under the control of the valve 125 while the plunger 130 is actuated by a coiled spring. Pivotally mounted on the pivot pin 114 of the oscillatory lever 107 is a reversible pawl 131 of the pull type having oppositely disposed pawl portions 132 and 133 offset in longitudinally spaced relation for engagement with reversely positioned ratchet teeth 134 and 135 formed on the feed nut periphery. When pressure fluid is supplied by the valve 125 to the plunger bore to act on the plunger 129, the pawl is held in the position shown in Fig. 10 with the pawl portion 132 engaging the ratchet teeth 134, and as the lever 107 is oscillated by the rifle bar during reciprocation of the hammer piston, the feed nut is intermittently rotated by the pull of the pawl portion 132 upon the ratchet teeth 134. When the bore of the plunger 129 is vented the coiled spring acting on the plunger 130 moves the pawl into the dotted line position shown in Fig. 10 with a pawl portion 133 engaging the ratchet teeth 135, and as the lever 107 is oscillated by the rifle bar, the pawl portion engages with a pulling action the ratchet teeth 135 to rotate the feed nut in the opposite direction.

In the several forms of the invention described, the springs, such as 48, 52, 84, 90 and 98 have not been shown with ball-bearings or other anti-friction devices arranged at one end thereof to facilitate spring rotation or rotation relative to said spring, as it is obvious that with abundant lubrication, such devices would not be necessary. It will be evident that the gearing etc. will be thoroughly lubricated in practice, and if it were desired to provide anti-friction devices, this would be obvious and involve no need for more than mechanical skill.

In all of the forms of the invention above described, when it is desired to effect manual feed of the drill, the locking pin 72 may be released from the feed screw, and upon rotation of the feed screw by the manual operating handle 76 the drilling motor may be manually fed forwardly or rearwardly along the shell guideways as desired. In the forms of Figs. 8 and 9 and of Figs. 10 to 13, the appropriate pawl will be rendered effective, depending upon the desired direction of manual feed. Other uses and advantages of the improved feeding means will be clearly apparent to those skilled in the art.

While I have in this application specifically described several forms which my invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. In a rock drill, the combination with a drilling motor having a cylinder having a rear head member, said cylinder containing a reciprocating hammer piston for percussively actuating a drill steel, and a ratchet and pawl type rotation mechanism for the drill steel and including a rifle bar rotated by the hammer piston, of feeding means for the drilling motor operated by the rotary motion of said rifle bar and embodying reversing means mounted on said drilling motor to move therewith and enclosed within said rear head member for effecting feed of the drilling motor in either of opposite directions while said rifle bar rotates always in the same direction.

2. In a rock drill the combination with a drilling motor having a reciprocating hammer piston for percussively actuating a drill steel and drill steel rotating mechanism operated by said hammer piston and including a rotary element, of feeding means for the drilling motor including feed mechanism driven by said rotary element of said rotation mechanism and carried within the rear end of said drilling motor, said feed mechanism embodying a spring loaded friction clutch set at a predetermined load and adapted to yield automatically upon overloading of the feeding means.

3. In a rock drill, the combination with a drilling motor having a reciprocating hammer piston for percussively actuating a drill steel and drill steel rotation mechanism operated by said hammer piston, of feeding means for the drilling motor including feed gearing mounted on said drilling motor to move therewith and driven by a rotary element of said rotation mechanism and carried within the rear end of said drilling motor, said drilling motor comprising a rear housing enclosing said feed gearing and said feed gearing embodying reversing means selectively operable to effect feed in either of opposite directions while said rotary element always rotates in the same direction.

4. In a rock drill, the combination with a drilling motor and a guide shell on which the motor is slidably guided, of automatic feeding means operated by the drilling motor for feeding the drilling motor along the guide shell, and means operative when said automatic feeding means is inoperative for manually feeding the drilling motor relative to said shell, said feeding means including a feed screw journaled on said guide shell, a feed nut rotatably mounted and movable with said drilling motor, means for holding said feed screw against rotation, and means for holding said feed nut against rotation, said automatic means being operative to rotate said feed nut when said feed screw is held stationary, and said manual means being operative to rotate said feed screw when said feed nut is held against rotation and disconnected from said automatic means.

5. In a rock drill, the combination with a drilling motor having a cylinder having an end housing, said cylinder containing a reciprocating hammer piston for percussively actuating a drill steel and drill steel rotation means operated by the hammer piston and including a rotatable rifle bar, of feeding means for the drilling motor operated by the rotary motion of the rifle bar for effecting feed of said drilling motor in either of opposite directions and including a feed driving element rotatable with the rifle bar, a rotatable feeding element, and transmission means connecting said feed driving element with said rotatable feeding element and embodying selective reverse gearing enclosed within said end housing and movable directly with the drilling motor for effecting rotation of said feeding element in either of opposite directions while said feed driving element rotates always in the same direction.

6. In a rock drill, the combination with a drilling motor having a reciprocating hammer piston for percussively actuating a drill steel and drill steel rotation means operated by the hammer piston and including a rotatable rifle bar, of feeding means for the drilling motor operated by the rotary motion of the rifle bar and including a feed driving element rotatable with the rifle bar, a rotatable feeding element, and transmission means connecting said feed driving element with said rotatable feeding element and embodying a friction clutch located in the transmission means between the feed driving element and said feeding element and set at a predetermined load for automatically preventing overloading of the rotation means.

7. In a rock drill, the combination with a drilling motor having a reciprocating hammer piston for percussively actuating a drill steel and drill steel rotation means operated by the hammer piston and including a rotatable rifle bar, of feeding means for the drilling motor operated by the rotary motion of the rifle bar and including a feed driving element rotatable with the rifle bar, a rotatable feeding element, and transmission means connecting said feed driving element with said rotatable feeding element and embodying a friction clutch for connecting said driving element to said feeding element and set under a predetermined load whereby the clutch is adapted to slip when the feeding means is overloaded, thereby to prevent automatically overloading of the rotation means.

8. In a rock drill, the combination with a drilling motor having a drill steel actuator, of means operated by said drill steel actuator for effecting feed of said drilling motor in either of opposite directions and embodying reversing gearing enclosed within the rear end of and carried directly by said drilling motor to move bodily therewith whereby the direction of feed may be reversed at will.

9. In a rock drill, the combination with a drilling motor comprising a cylinder having a rear head block and a reciprocating hammer piston contained in said cylinder for percussively actuating a drill steel, of feeding means for the drilling motor operated by said hammer piston for effecting feed of the drilling motor in either of opposite directions including a rifle bar rotated by the hammer piston, a feeding element actuated by said rifle bar, and reversing means enclosed within said rear head block for effecting actuation of said feeding element selectively in opposite directions while said rifle bar rotates always in the same direction.

10. In a rock drill, the combination with a drilling motor comprising a cylinder having a rear head block and a reciprocating hammer piston contained in said cylinder for percussively actuating a drill steel, of feeding means for the drilling motor for feeding the latter in either of opposite directions including a rotation bar slidingly interlocked with and rotated by said hammer piston, a feeding element, gearing operatively connecting said rotation bar to said feeding element and embodying reversing gears mounted on said drilling motor to move bodily therewith and enclosed within said rear head block for effecting rotation of said feeding element selectively in opposite directions while said rotation bar rotates always in the same direction.

11. In a rock drill, the combination with a drilling motor comprising a cylinder having a rear head block and a reciprocating hammer piston contained in said cylinder for percussively actuating a drill steel, of feeding means for the drilling motor including a rotary element actuated by said hammer piston, and feed gearing driven by said rotary element and carried within the rear end of said drilling motor, said feed gearing embodying reversing means enclosed within said rear head block and selectively operable to effect feed in either of opposite directions while said rotary element always rotates in the same direction.

12. In a rock drill, the combination with a drilling motor comprising a cylinder having a rear head block and a reciprocating hammer piston contained in said cylinder for percussively actuating a drill steel, of feeding means for the drilling motor including a rifle bar connected to and rotated by said hammer piston, a feed driving element rotatable with the rifle bar, a rotatable feeding element, and transmission means connecting said feed driving element with said rotatable feeding element and embodying selective reverse gearing mounted on said drilling motor to move bodily therewith and enclosed within said rear head block for effecting rotation of said feeding element in either of opposite directions while said feed driving element rotates always in the same direction.

13. In combination, a guide shell providing a longitudinal guideway, a member to be fed slidably guided on said shell guideway for rectilinear movement therealong, and means for feeding said member along said guideway including relatively rotatable, threadedly connected feed screw and nut elements, said feed screw element extending in parallelism with said guideway, and means movable along said guideway with said member to be fed for effecting intermittent rotation of one of said screw and nut elements relative to the other to effect intermittent feed of said member either forwardly or rearwardly along said shell guideway including a pressure-fluid-operated motor having relatively reciprocable cylinder and piston elements and movable along said guideway with said member to be fed and arranged with its cylinder axis extending longitudinally of the feed screw element and shell guideway, and transmission means also movable along the guideway with said member to be fed during feeding and actuated by the reciprocating element of said motor for effecting rotation of the rotatable one of said screw and nut elements in either of opposite directions relative to the other thereof, said transmission means including reversible ratchet means operable at will to effect rotation of said rotatable element in either of opposite directions relative to said other element.

14. In a rock drill, the combination with a drilling motor having a reciprocating hammer piston for percussively actuating a drill steel and drill steel rotation means operated by the hammer piston and including a rotation bar connected to the piston, of feeding means for the drilling motor operated by the rotary motion of said rotation bar and including a feed driving element rotatable with said rotation bar, a rotatable feeding element, and transmission means connecting said driving element with said rotatable feeding element and embodying a spring loaded friction clutch located in the transmission means between the feed driving element and said feeding element and set at a predetermined load for automatically preventing overloading of the rotation means, said clutch adapted to slip automatically when the feeding means is overloaded.

15. In a rock drill, the combination with a drilling motor having a drill steel actuator and drill steel rotation means driven by said drill steel actuator, of means operated by an element of said steel rotation means for automatically feeding the drilling motor and embodying a feed driving mechanism carried within the rearward end of said drilling motor, said feed driving mechanism including an eccentric operated by said rotation element and an oscillatory element actuated by said eccentric.

16. In a rock drill, the combination with a drilling motor having a drill steel actuator and drill steel rotation means driven by said drill steel actuator, of means operated by an element of said steel rotation means for automatically feeding the drilling motor and embodying a feed driving mechanism carried within the rearward end of said drilling motor, said feed driving mechanism including an eccentric operated by said rotation element, an oscillatory element actuated by said eccentric, a pawl actuated by said oscillatory element and a ratchet engaged by said pawl.

17. In a rock drill, the combination with a drilling motor having a drill steel actuator and drill steel rotation means driven by said drill steel actuator, of means operated by an element of said steel rotation means for automatically feeding the drilling motor in either of opposite directions and embodying a feed driving mechanism carried within the rearward end of said drilling motor, said feed driving mechanism including an eccentric operated by said rotation element, an oscillatory element actuated by said eccentric and a reversible ratchet and pawl device actuated by said oscillatory element.

18. In combination, a guide shell providing a longitudinal guideway, a member to be fed slidably guided on said shell guideway for rectilinear movement therealong, a feed screw supported by said shell in parallelism with said guideway and fixed against rotation with respect to said shell, a feed nut journaled in said member to be fed and threadedly engaging said feed screw, and means carried by said member to be fed for effecting intermittent rotation of said feed nut to effect intermittent feed of said member either forwardly or rearwardly along said shell guideway including a motor cylinder on said member to be fed and arranged with its bore in parallelism with the feed screw and shell guideway, a pressure fluid actuated piston reciprocable in said cylinder bore, and means actuated by said piston for effecting rotation of said feed nut relative to said feed screw, said feed nut rotating means embodying reversible ratchet means operable at will for effecting rotation of said feed nut in either of opposite directions relative to said screw.

19. In combination, a guide shell providing a longitudinal guideway, a member to be fed slidably guided on said shell guideway for rectilinear movement therealong, a feed screw supported by said shell in parallelism with said guideway and fixed against rotation with respect to said shell, a feed nut journaled in said member to be fed and threadedly engaging said feed screw, and means carried by said member to be fed for effecting intermittent rotation of said feed nut to effect intermittent feed of said member either forwardly or rearwardly along said shell guideway including a motor cylinder supported by said member to be fed and arranged with its bore in parallelism with the feed screw and shell guideway, a pressure fluid actuated piston reciprocable in said cylinder bore, and means actuated by said piston for effecting rotation of said feed nut relative to said feed screw, said feed nut rotating means embodying means for effecting feed nut rotation in either of opposite directions relative to said screw and including ratchet and pawl reversing mechanism operable at will to effect reversal of feed nut rotation.

20. In combination, a guide shell providing a longitudinal guideway, a member to be fed slidably guided on said shell guideway for rectilinear movement therealong, a feed screw supported by said shell in parallelism with said guideway and fixed against rotation with respect to said shell, a feed nut journaled in said member to be fed and threadedly engaging said feed screw, and means carried by said member to be fed for effecting intermittent rotation of said feed nut to effect intermittent feed of said member either forwardly or rearwardly along said shell guideway including a motor cylinder supported by said member to be fed and arranged with its bore in parallelism with the feed screw and shell guideway, a pressure fluid actuated piston reciprocable in said cylinder bore, and means actuated by said piston for effecting rotation of said feed nut relative to said screw including a rifle bar actuated by said piston, said feed nut rotating means embodying reversible ratchet means operable at will for effecting feed nut rotation in either of opposite directions relative to said feed screw.

21. In combination, a guide shell providing a longitudinal guideway, a member to be fed slidably guided on said shell guideway for rectilinear movement therealong, a feed screw supported by said shell in parallelism with said guideway and fixed against rotation with respect to said shell, a feed nut journaled in said member to be fed and threadedly engaging said feed screw, and means carried by said member to be fed for effecting rotation of said feed nut to effect feed of said member either forwardly or rearwardly along said shell guideway including a motor cylinder supported by said member to be fed and arranged with its bore in parallelism with the feed screw and shell guideway, a pressure fluid actuated piston reciprocable in said cylinder bore, and means actuated by said piston for effecting rotation of said feed nut relative to said screw including a rifle bar actuated by said piston, said feed nut rotating means embodying means for effecting feed nut rotation in either of opposite directions relative to said feed screw and including reversible ratchet and pawl means ooperating with said rifle bar.

22. In combination, a guide shell providing a longitudinal guideway, a member to be fed slidably guided on said shell guideway for rectilinear movement therealong, a feed screw supported by said shell in parallelism with said guideway and fixed against rotation with respect to said shell, a feed nut journaled in said member to be fed and threadedly engaging said feed screw, and means carried by said member to be fed for effecting rotation of said feed nut to effect feed of said member either forwardly or rearwardly along said shell guideway including a motor cylinder supported by said member to be fed and arranged with its bore in parallelism with the feed screw and shell guideway, a pressure fluid actuated piston reciprocable in said cylinder bore, and means actuated by said piston for effecting rotation of said feed nut relative to said screw including a rifle bar actuated by said piston, said feed nut rotating means embodying means for effecting feed nut rotation in either of opposite directions relative to said feed screw and including reversible ratchet and pawl means cooperating with said rifle bar and means for reversing said ratchet and pawl means while said piston continuously reciprocates.

23. In combination, a guide shell providing a longitudinal guideway, a rock drill guided on said shell guideway for rectilinear movement therealong, a non-rotatable feed screw supported by said guide shell and arranged parallel with the shell guideway, a rotatable feed nut journaled in a part of said drill and threadedly engaging said feed screw, and means movable with the rock drill and arranged at the rearward end of the latter for rotating said feed nut in either of opposite directions relative to said feed screw to effect feed of the rock drill either forwardly or rearwardly along the shell guideway, said means including a rotatable rifle bar, reversible ratchet and pawl means connected to said rifle bar, and means operable at will for reversing said ratchet and pawl means while said rifle bar rotates.

24. In combination, a guide shell providing a longitudinal guideway, a member to be fed guided on said shell guideway for rectilinear movement therealong, a non-rotatable feed screw supported by said guide shell and arranged parallel to said shell guideway, a rotatable feed nut journaled in said member to be fed and threadedly engaging said feed screw, and means movable with said member to be fed for rotating said feed nut selectively in opposite directions to effect feed of the member to be fed in opposite directions including relatively rotatable screw and nut elements disposed with their axes parallel to the feed screw axis, a motor having its piston coaxial with said elements and reciprocable to effect their relative rotation, ratchet and pawl means coacting with one of said elements, and ratchet and pawl means between said elements and said feed nut.

25. In a rock drilling mechanism, the combination of a rock drill and a guide therefor, a hammer piston in the rock drill, feeding mechanism for moving the rock drill relatively to the guide, and means actuated by the hammer piston and operating to actuate the feeding mechanism to move the rock drill counter to the direction of movement of the hammer piston.

26. In a drilling apparatus, the combination with a support, of a drilling motor slidable on the support having a fluid actuated piston reciprocable therein, of a rotation mechanism included in said motor automatically actuated due to the reciprocatory motion of said piston, of a feeding mechanism for said motor including a stationary screw carried by the support in operative engagement with a rotatable nut carried by the motor for effecting feeding motion of the motor upon rotation of said nut, and resilient means for transmitting rotation from said rotation mechanism to said nut.

27. In a drilling apparatus, the combination with a support, of a drilling motor slidable on the support having a rotatable drill steel carried thereby, of a power actuated rotation mechanism for said drill steel, of a feeding mechanism for said motor including a duality of elements in operative engagement with each other one rotatable relative to the other for effecting feeding motion of the motor, means for resiliently transmitting rotation from said rotation mechnism to the rotatable element, and clutch means for automatically preventing said transmission when said rotatable element is subjected to a predetermined resistance to rotation.

28. In a drilling apparatus, the combination of a support, a drilling motor mounted on said support for guided movement with respect thereto, an element rotatable by said motor and moving with the latter with respect to said support, and feeding mechanism for feeding said motor relative to said support including an element movable with said motor relative to said support and rotatable to effect movement of said motor relative to said support and means including resilient rotation transmitting means movable with said motor relative to said support for transmitting rotation from said first mentioned element to said second mentioned element.

29. In a drilling apparatus, the combination of a support, a drilling motor mounted on said support for guided movement with respect thereto, an element rotatable by said motor and moving with the latter with respect to said support, and feeding mechanism for feeding said motor relative to said support including an element movable with said motor relative to said support and rotatable to effect movement of said motor relative to said support and means including resilient rotation transmitting means movable with said motor relative to said support for transmitting rotation from said first mentioned element to said second mentioned element, said rotation transmitting means including clutch means for automatically preventing said transmission when said second mentioned element is subjected to a predetermined resistance to rotation.

30. In a drilling apparatus, the combination of a support, a drilling motor mounted on said support for guided movement with respect thereto, said motor embodying an actuator for actuating a drilling implement and a rotation mechanism for rotating the drilling implement, and feeding mechanism for feeding said motor relative to said support including a rotatable feeding element movable with said motor relative to said support and means including resilient rotation transmitting means movable with said motor relative to said support for transmitting rotation from said rotation mechanism to said rotatable feeding element.

31. In a drilling apparatus, the combination of a support, a drilling motor mounted on said support for guided movement with respect thereto, said motor embodying an actuator for actuating a drilling implement and a rotation mechanism for rotating the drilling implement, and feeding mechanism for feeding said motor relative to said support including a rotatable feeding element movable with said motor relative to said support and means including resilient rotation transmitting means movable with said motor relative to said support for transmitting rotation from said rotation mechanism to said rotatable feeding element, said means for transmitting rotation from said rotation mechanism to said rotatable feeding element also including clutch means for automatically preventing said transmission when said rotatable feeding element is subjected to a predetermined resistance to rotation.

ELMER G. GARTIN.

CERTIFICATE OF CORRECTION.

Reissue No. 21,548. September 3, 1940.

ELMER G. GARTIN.

It is hereby certified that error appears in the printed specification of the above numbered patent requiring correction as follows: Page 4, second column, line 37, claim 2, for "rotating" read --rotation--; page 7, first column, line 4-5, claim 21, for "ooperating" read --cooperating--; and that the said Letters Patent should be read with this correction therein that the same may conform to the record of the case in the Patent Office.

Signed and sealed this 29th day of October, A. D. 1940.

Henry Van Arsdale,
Acting Commissioner of Patents.

(Seal)